United States Patent
Morgan

(10) Patent No.: US 8,097,069 B2
(45) Date of Patent: Jan. 17, 2012

(54) PRESSURISED CONTAINER

(76) Inventor: David Morgan, Hertfordshire (GB)

( * ) Notice: Subject to any disclaimer, the term of this patent is extended or adjusted under 35 U.S.C. 154(b) by 470 days.

(21) Appl. No.: 12/370,851

(22) Filed: Feb. 13, 2009

(65) Prior Publication Data
US 2009/0205497 A1   Aug. 20, 2009

(30) Foreign Application Priority Data
Feb. 15, 2008   (GB) .................................. 0802763.3

(51) Int. Cl.
*B01D 19/00* (2006.01)
(52) U.S. Cl. ................ 95/260; 96/217; 96/196; 96/198; 96/215; 95/261
(58) Field of Classification Search .............. 95/260, 95/261, 266; 96/217, 204, 193, 196, 198, 96/215
See application file for complete search history.

(56) References Cited

U.S. PATENT DOCUMENTS

| | | | | |
|---|---|---|---|---|
| 2,376,221 | A | * | 5/1945 | Baker ................. 95/30 |
| 3,347,023 | A | * | 10/1967 | Scott ................. 96/158 |
| 3,432,996 | A | | 3/1969 | Patterson .............. 55/189 |
| 3,616,601 | A | * | 11/1971 | Senkewich ............. 95/260 |
| 3,975,171 | A | | 8/1976 | Burnham, Sr. et al. ...... 55/36 |
| 4,414,006 | A | * | 11/1983 | Armstrong ............. 96/174 |
| 4,604,109 | A | * | 8/1986 | Koslow ............... 95/248 |
| 5,044,761 | A | | 9/1991 | Yuhki et al. ............ 366/139 |
| 5,232,475 | A | * | 8/1993 | Jepson ................ 95/260 |
| 5,651,809 | A | | 7/1997 | Schnur ................ 95/261 |

FOREIGN PATENT DOCUMENTS

| | | |
|---|---|---|
| EP | 0404067 | 12/1990 |
| JP | 56-56203 | 5/1981 |
| SU | 577317 | 10/1977 |
| WO | WO 2007/013829 | 2/2007 |
| WO | WO 2007013829 A2 * | 2/2007 |

OTHER PUBLICATIONS

British Search Report dated Apr. 30, 2008, Examiner Rivas (GB0802763.3).

* cited by examiner

*Primary Examiner* — Duane Smith
*Assistant Examiner* — Douglas Theisen
(74) *Attorney, Agent, or Firm* — Hayes Soloway P.C.

(57) ABSTRACT

A pressurized container (10, 20) for containing oil and a gas dissolved therein at a constant overall average pressure at a pressure above atmospheric pressure comprising a means (11a, 11b, 11c, 11d, 21a, 21b, 21c, 21d) for introducing a local area of reduced pressure within the oil. Preferably the local area of reduced pressure result in the gas dissolved in the oil evolving from the oil. This enables gas to be evolved from the oil without needing to reduce the pressure of the entire volume of oil which the gas is to be evolved from. The evolved gas and remaining oil occupy a greater volume than did the gas containing oil and consequently the pressure in the vessel will increase. This will allow the gas to be drawn off while the overall pressure of the container (10, 20) is maintained.

18 Claims, 4 Drawing Sheets

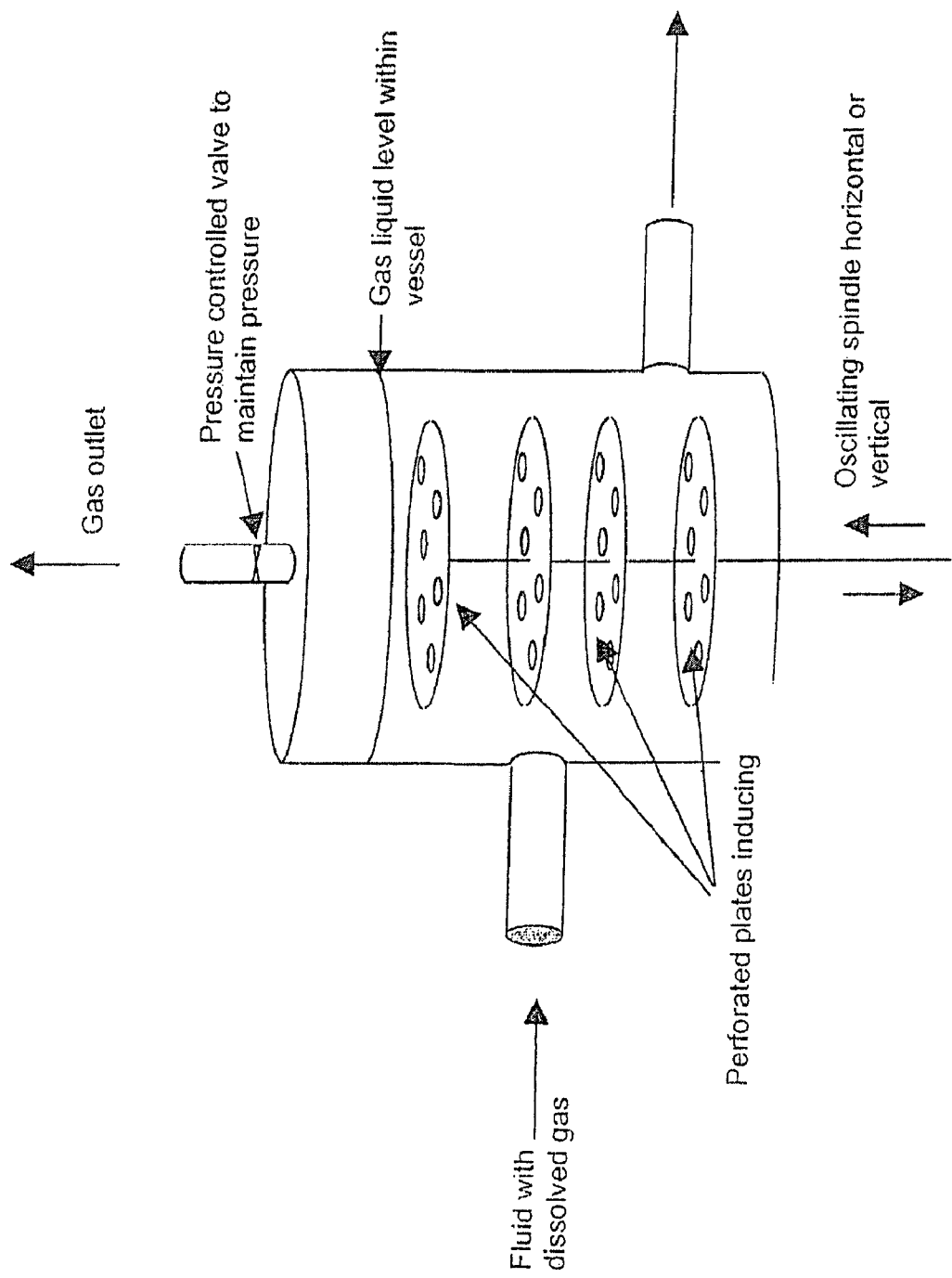

PRESSURISED CONTAINER

FIELD OF THE INVENTION

The present invention relates to a method and apparatus for removing gas dissolved in a liquid whilst the pressure of the liquid is maintained. More specifically the present invention relates to a method and apparatus for removing gas dissolved in oil whilst the average overall pressure of the oil is maintained at a pressure above atmospheric pressure. This is particularly applicable for removing natural gas dissolved in crude oil.

BACKGROUND OF THE INVENTION

Many liquids have dissolved within them a gas, either of the same chemical composition as the liquid itself or of a different chemical composition. When the pressure of such a gas containing liquid is reduced below a certain pressure, known as the saturation pressure, the gas dissolved in the liquid evolves out of solution to form a distinct gas phase separate from the liquid itself. When this process occurs within a sealed vessel the gas phase evolves from the liquid to form a distinct gas phase above the liquid.

A common example of this process occurs in carbonated drinks. The carbonated drinks container is pressurised when the container is sealed. Once a consumer purchases the carbonated drink and opens the container the pressure of the carbonated liquid is reduced below the saturation pressure. This results in the dissolved gas, carbon dioxide, evolving from the liquid and the recognised hiss of the gas escaping from the container as it opens can be heard.

Although the dissolved gas escaping from the pressurised container is not of particular concern in the carbonated drinks industry, it is of major concern in other industries and in particular the upstream oil industry. When crude oil is extracted from underground wells, the oil contains a significant amount of dissolved natural gas. Natural gas is highly flammable and thus, for safety reasons, it is necessary that for storage and transportation to remove the dissolved natural gas from the crude oil. The gas also needs to be removed so that the crude oil can be transported via pipelines. If the gas was not removed then, as the oil moves along the pipeline, the pressure would inevitably drop within the pipeline at some stage, resulting in the gas evolving from solution and in doing so it would block the oil flow. The natural gas is typically removed from the crude oil by reducing the pressure of the crude oil, which when extracted from underground has a very high pressure, such that the natural gas evolves out of solution. Typically the pressure of the crude oil is reduced in stages over a period of time, until the crude oil reaches atmospheric pressure.

Once the crude oil has been de-pressurised to remove the natural gas dissolved therein, it is then necessary to re-pressurise the crude oil for transportation. Since crude oil is generally transported through pipelines, in order to cover any significant distance by such a pipeline the crude oil needs to be re-pressurised to a pressure of several hundred PSI. This re-pressurisation may be carried out using electrically or mechanically powered pumps.

This de-pressurising and re-pressurising of the crude oil involves a significant amount of energy, resulting in a high cost overall both financially and environmentally in terms of wasted resources.

It is an object of the present invention to overcome or mitigate some of the problems above.

SUMMARY OF THE INVENTION

According to an aspect of the present invention there is provided a pressurised container for containing oil and a gas dissolved therein at a constant average pressure above atmospheric pressure comprising a mechanical cavitating means for introducing a local area of reduced pressure within the oil, wherein the mechanical cavitation means is submerged below the surface of the oil in use and wherein the local area of reduced pressure result in the gas dissolved in the oil evolving from the oil.

Preferably the local area(s) of reduced pressure result in the gas dissolved in the liquid evolving from the liquid. This enables gas to be evolved from the liquid without needing to reduce the pressure of the entire volume of liquid which the gas is to be evolved from. The evolved gas and remaining fluid have a tendency to occupy a greater volume than did the gas containing fluid and consequently the pressure in the container will increase. This will allow the gas to be drawn off while the overall pressure of the container is maintained. This differs from conventional stirring which may also use propeller like means for stirring as the stirring action is designed to mix components together whereas the cavitating action for creating local area(s) of reduced pressure is designed to separate components from each other.

Preferably the means for introducing one or more local area(s) of reduced pressure within the oil is a mechanical cavitating means, more preferably the mechanical cavitating means is a rotating propeller. This enables a small amount of energy to be utilised in order for the gas to be evolved from the liquid whilst maintaining the overall pressure of the oil to avoid the re-pressurisation of the liquid once all of the gas has been evolved.

In the alternative the means for introducing one or more local area(s) of reduced pressure within the oil is a mechanical cavitating means, more preferably the mechanical cavitating means is an oscillating perforated plate, most preferably the mechanical cavitating means is a rotating perforated plate.

Preferably the container further comprises a pressure regulating means for regulating the average pressure of the container. This means that as the gas evolves from the oil the overall pressure of the container tends to build up as the gas layer forms above the oil layer. Although the oil shrinks slightly as gas is evolved, the gas takes up a significantly greater volume than it did in solution and the pressure of the system increases. The pressure regulating means will allow for the gas to be collected from the container as the pressure within the container increases as the gas evolves. Preferably the pressure regulating means comprises a valve, more preferably the valve is a one way valve.

Preferably the oil is crude oil and the gas is natural gas. Such a container is particularly applicable to the crude oil industry where significant amounts of energy are required to de-pressurise and then re-pressurise crude oil to remove any natural gas dissolved therein. Such a container of the present invention will allow for removal of the natural gas from the crude oil without such significant levels of energy consumption.

According to a further aspect of the present invention there is provided a method for introducing a local area of reduced pressure within oil contained within a pressurised container, the container being maintained at a constant average overall pressure above atmospheric pressure, wherein the oil comprises gas dissolved therein, the method comprising:

use of a mechanical cavitating means to reduce the pressure of the oil within a local area, wherein the mechanical cavitating means is submerged below the surface of the oil and wherein the local area of reduced pressure result in the gas dissolved in the oil evolving from the oil.

Preferably the means for introducing one or more local area(s) of reduced pressure within the oil is a mechanical cavitating means, more preferably the mechanical cavitating means is a rotating propeller.

In the alternative the means for introducing one or more local area(s) of reduced pressure within the oil is a mechanical cavitating means, more preferably the mechanical cavitating means is an oscillating perforated plate, most preferably the cavitating means is a rotating perforated plate.

Preferably the method further comprises providing a pressure regulating means for regulating the average pressure of the container, more preferably the pressure regulating means comprises a valve, most preferably the valve is a one way valve.

Preferably the oil is crude oil and the gas is natural gas.

DESCRIPTION OF THE DRAWINGS

The present invention will now be described by way of example only with reference to the accompanying drawings, wherein:—

FIG. 4 shows a schematic view of a pressurised container of the present invention wherein the cavitating means is a series of perforated plates

DETAILED DESCRIPTION

The present embodiments represent currently the best ways known to the applicant of putting the invention into practice. But they are not the only ways in which this can be achieved. They are illustrated and they will now be described, by way of example only.

Figure 1:
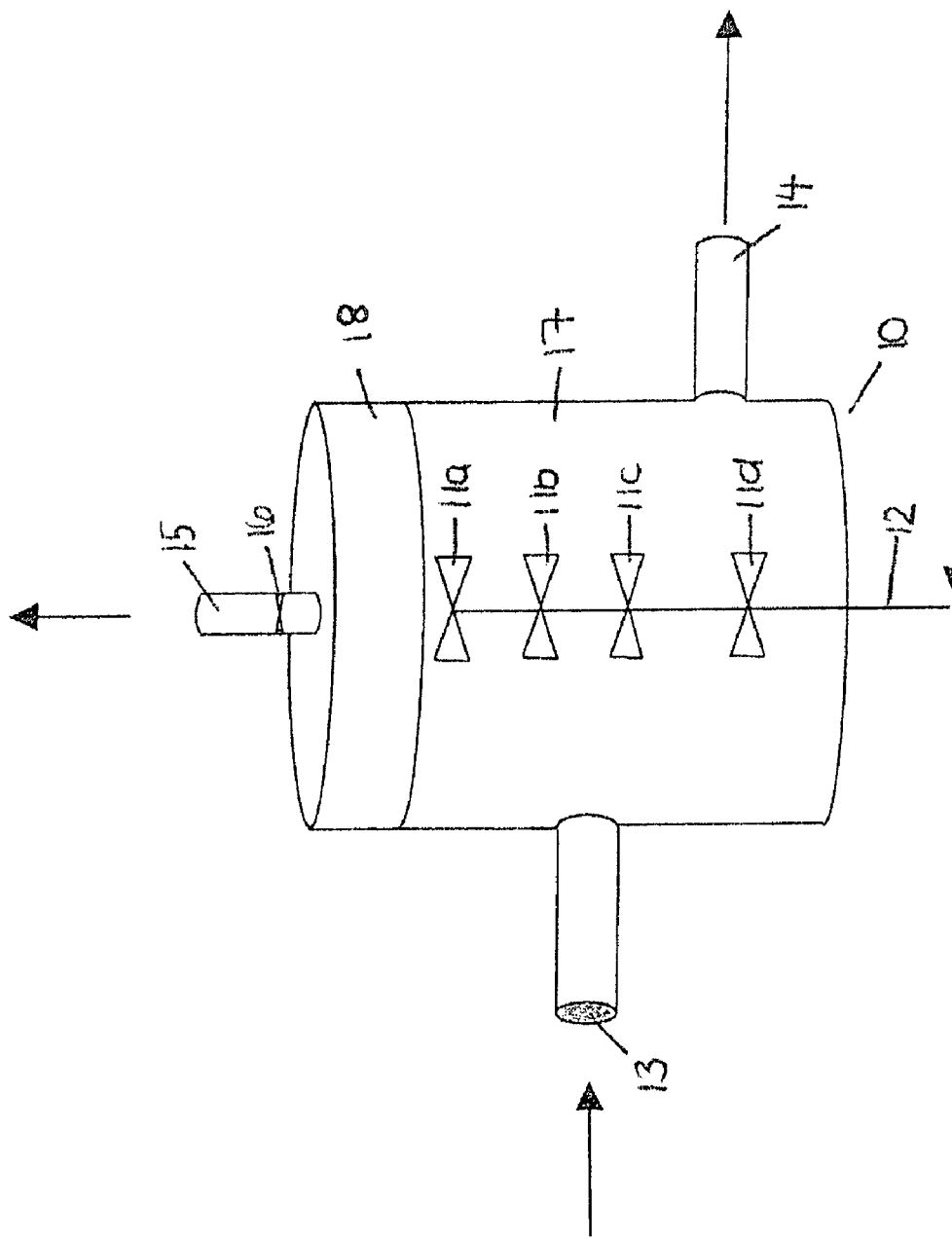
FIG. 1 shows a schematic view of a pressurised container of the present invention wherein the cavitating means is a series of propellers

Referring to FIG. 1, which shows a transparent view of a pressurised container 10 of the present invention wherein the mechanical cavitating means is a series of propellers 11a, 11b, 11c, 11d mounted to a central spindle arm 12. In the embodiment shown in FIG. 1 the spindle arm 12 is mounted vertically. In an alternative embodiment (not shown) the spindle arm 12 may be mounted horizontally. The spindle arm 12 is attached to a motor (not shown), which rotates the spindle arm 12 in either a clockwise or anticlockwise direction. When the spindle arm 12 is rotated the propellers 11a, 11b, 11c, 11d rotate in the same direction as the spindle arm. In the particular embodiment shown in FIG. 1 the propellers 11a, 11b, 11c, 11d employed are impellers. As can be seen in FIG. 1 the mechanical cavitating means is located below the surface of the oil and is submerged in the oil in use.

The mechanical cavitating means may be propellers which themselves are fixed and act as paddles which are rotated around the central spindle arm 12. In the alternative the propellers may themselves rotate around an axis in a similar way to a boat or aeroplane propeller, or further in the alternative the propellers may individually rotate around an axis and rotate around the central spindle arm 12. The mechanical cavitating means in a further alternative may be a perforated plate, in one alternative the perforated plate is rotated around the central axis of the spindle arm 12, in a further alternative the perforated plate oscillates vertically up and down the spindle arm 12, in a further alternative the perforated plate rotates around the central axis of the spindle arm 12 and oscillates vertically up and down the spindle arm 12.

The container 10 further comprises an inlet port 13, wherein oil with dissolved gas can be introduced into the container. In preferred embodiments the oil introduced into the container will be crude oil. The container 10 also comprises an outlet port 14 wherein oil which no longer contains dissolved gas can be removed from the container 10. The top region of the container 10 is provided with a gas outlet port 15 and a valve 16. The oil containing portion of the container is marked by reference 17 and the gas containing portion is marked by reference 18.

In operation the container 10 is filled through inlet port 13 such that region 17 contains crude oil, which has natural gas dissolved in it. During filling outlet port 14 remains closed, and once the container has been filled inlet port 13 is then closed. The spindle arm 12 is then rotated by means of a motor, which in turn rotates the propellers 11a, 11b, 11c, 11d. As the propellers rotate they create areas of low pressure within the crude oil, and this induces the dissolved natural gas out of solution. The evolved natural gas does not immediately dissolve back into solution but instead rises up through the crude oil to the surface. The natural gas then sits in region 18 above the crude oil in the container. When the natural gas evolves from the crude oil the overall pressure of the container increases. This is because the volume taken up by the separate crude oil and natural gas phases is greater than the volume taken up the crude oil when the natural gas was in solution. As the pressure inside the container increases the valve 16 is opened. In one alternative the valve may be operated manually, or in the alternative the valve may operate automatically when a certain pressure inside the container is reached. When the valve 16 is opened the natural gas in area 18 leaves the container through the gas outlet port 15 where it can be collected. Once the natural gas has been evolved from the crude oil the crude oil is then removed from the container through outlet port 14. The crude oil is then safe for storage and transportation.

In an alternative embodiment in operation the container 10 is filled through inlet port 13 such that region 17 contains crude oil, which has natural gas dissolved in it. During filling outlet port 14 remains closed. Once the container 10 has been filled the spindle arm 12 is then rotated by means of a motor, which in turn rotates the propellers 11a, 11b, 11c, 11d. As the propellers rotate they create areas of low pressure within the crude oil, and this induces the dissolved natural gas out of solution. The evolved natural gas does not immediately dissolve back into solution but instead rises up through the crude oil to the surface. The natural gas then sits in region 18 above the crude oil in the container. When the natural gas evolves from the crude oil the overall pressure of the container increases. This is because the volume taken up by the separate crude oil and natural gas phases is greater than the volume taken up the crude oil when the natural gas was in solution. As the pressure inside the container increases the valve 16 is opened. In one alternative the valve may be operated manually, or in the alternative the valve may operate automatically when a certain pressure inside the container is reached. When the valve 16 is opened the natural gas in area 18 leaves the container through the gas outlet port 15 where it can be collected. Once the cavitation process has begun the outlet port 14 is opened allowing crude oil to leave the container 10, and inlet port 13 remains open such that crude oil is allowed to flow through the container. Preferably the inlet port 13 and outlet port 14 are at different heights in the container such that the crude oil is cavitated to some extent before leaving the container 10. Once the crude oil exists the container through outlet port 14 it enters a further identical chamber where further cavitation occurs. This process may occur through a number of identical chambers until all the natural gas has been evolved. Once the natural gas has been evolved from the crude oil the crude oil is then removed from the final container through outlet port 14. The crude oil is then safe for storage and transportation. This continuous batch process can be run as the oil exists the underground wells above ground as the oil is being extracted.

Figure 2:
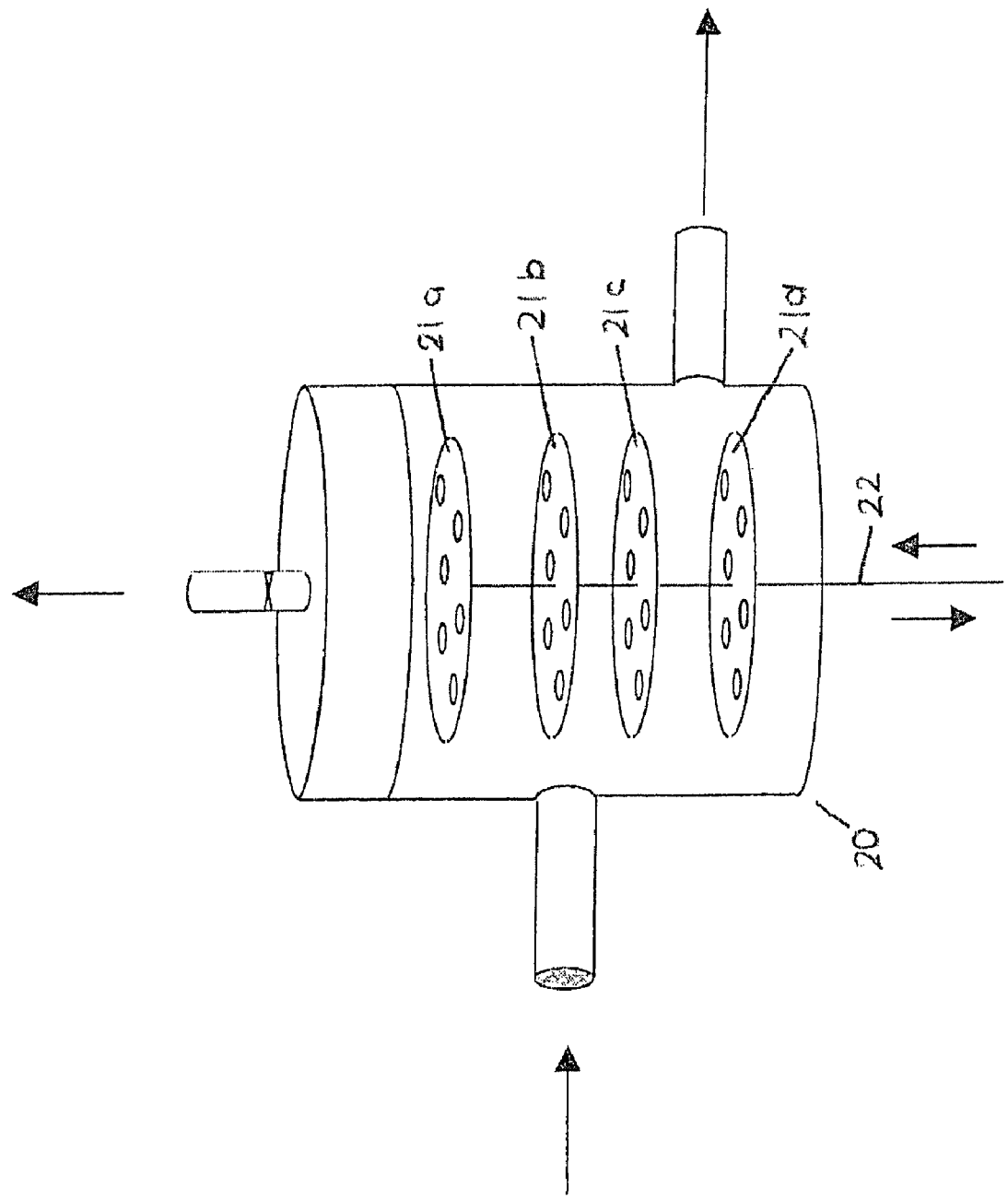
FIG. 2 shows a schematic view of a pressurised container of the present invention wherein the cavitating means is a series of perforated plates
Figure 3:
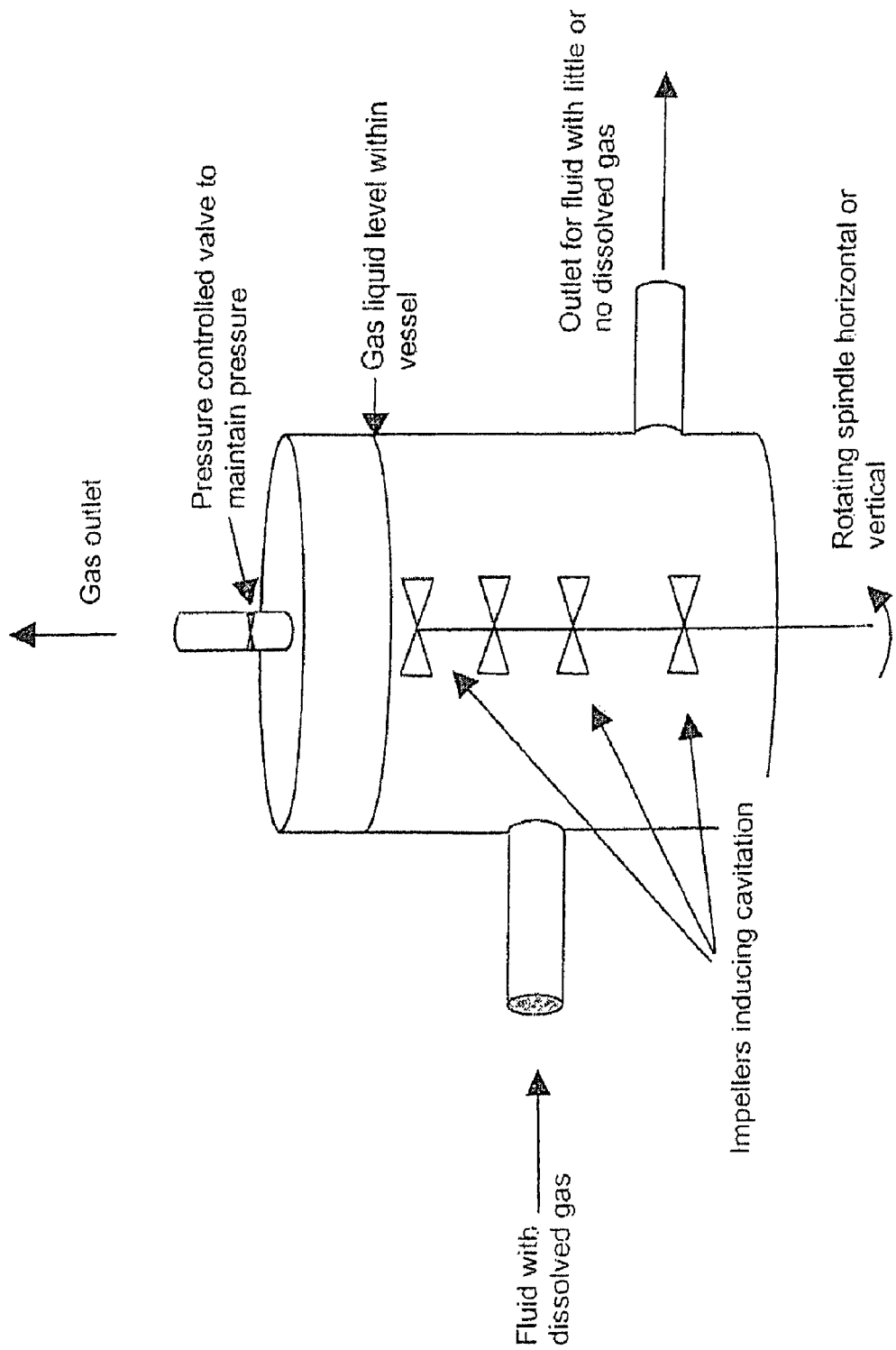
FIG. 3 shows a schematic view of a pressurised container of the present invention wherein the cavitating means is a series of propellers

In an alternative embodiment of the container 20 shown in FIG. 2 the cavitating means comprises a series of perforated plates 21a, 21b, 21c, 21d. In the embodiment shown in FIG. 2 the spindle arm 22 is mounted vertically, although in an alternative embodiment (not shown) the spindle arm 22 may be mounted horizontally. The spindle arm 22 is attached to a motor (not shown), which oscillates the spindle arm 22 vertically when the spindle arm 22 is mounted vertically, or horizontally when the spindle arm 22 is mounted horizontally. When the spindle arm 12 is oscillated the perforated plates 21a, 21b, 21c, 21d oscillate in the same direction as the spindle arm. In addition the 21a, 21b, 21c, 21d may also be configured in addition or in the alternative to rotate about the spindle arm.

The mechanical cavitating means described above are not intended to be limiting. Rather they illustrate two common types of mechanical cavitator which are available. Thus the term "mechanical cavitation means" should not be imitated by the specific exemplified embodiments in the description and the drawings, but should include all mechanical cavitating means capable of creating localised areas of low pressure in oil, which are located below the surface of the oil.

The invention claimed is:

1. A pressurised container for containing crude oil and a natural gas dissolved therein at a constant average pressure above atmospheric pressure comprising a mechanical cavitating device for introducing a local area of reduced pressure below the surface of the crude oil, wherein the mechanical cavitation device is submerged below the surface of the crude oil in use and wherein the local area of reduced pressure results in the natural gas dissolved in the crude oil evolving from the crude oil.

2. A pressurised container as claimed in claim 1 wherein the mechanical cavitating device is a propeller.

3. A pressurised container as claimed in claim 1 wherein the mechanical cavitating device is a rotating propeller.

4. A pressurised container as claimed in claim 1 wherein the mechanical cavitating device is a perforated plate.

5. A pressurised container as claimed in claim 1 wherein the mechanical cavitating device is an oscillating perforated plate.

6. A pressurised container as claimed in claim 1 wherein the mechanical cavitating device is a rotating perforated plate.

7. A pressurised container as claimed in claim 1 further comprising a pressure regulator for regulating the average pressure of the container.

8. A pressurised container as claimed in claim 7 wherein the pressure regulator comprises a valve.

9. A pressurised container as claimed in claim 8 wherein the valve is a one way valve.

10. A method for introducing a local area of reduced pressure below the surface of crude oil contained within a pressurised container, the container being maintained at a constant average overall pressure above atmospheric pressure, wherein the crude oil comprises natural gas dissolved therein, the method comprising:
  use of a mechanical cavitating device to reduce the pressure of the oil within a local area below the surface of the crude oil, wherein the mechanical cavitating device is submerged below the surface of the crude oil and wherein the local area of reduced pressure results in the natural gas dissolved in the crude oil evolving from the crude oil.

11. A method as claimed in claim 10 wherein the mechanical cavitating device is a propeller.

12. A method as claimed in claim 10 wherein the mechanical cavitating device is a rotating propeller.

13. A method as claimed in claim 10 wherein the mechanical cavitating device is a perforated plate.

14. A method as claimed in claim 10 wherein the mechanical cavitating device is an oscillating perforated plate.

15. A method as claimed in claim 10 wherein the mechanical cavitating device is a rotating perforated plate.

16. A method as claimed in claim 10 wherein the method further comprises providing a pressure regulator for regulating the average pressure of the container.

17. A method as claimed in claim 16 wherein the pressure regulator comprises a valve.

18. A method as claimed in claim 17 wherein the valve is a one way valve.

* * * * *